9422X

I. Schmaltzman.

Spectacle Glasses.

Patented Feb. 20, 1836.

Feb 20. 1836

Isaac Schnaitmann 9422X

Letters Patent

The Schedule referred to in these Letters Patent and making part of the same containing a description in the words of the said Isaac Schnaitmann himself of his improvement in Glasses for Spectacles and other optical purposes.

To all to whom these presents shall come.

Figure 1:
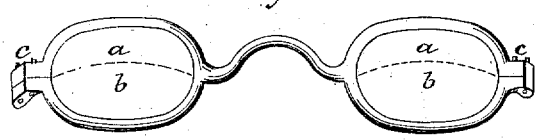
Figure 2:
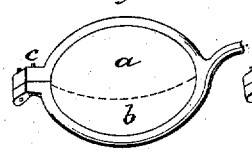
Figure 3:
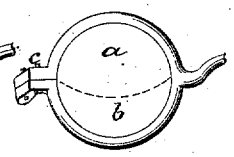
Figure 4:
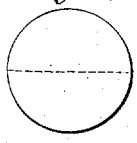
Figure 5:
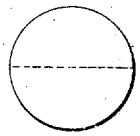
Figure 6:
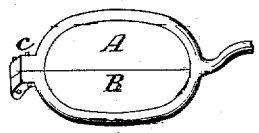

Be it known that I Isaac Schnaitmann of the Northern Liberties County of Philadelphia and State of Pennsylvania have invented a new and useful improvement in Spectacle glasses and that the following is a description thereof. The improvement consists in each glass being ground with two different and distinct foci. the upper part or segment is ground to a focus for discerning objects at a distance and the lower part ground to a focus for seeing objects near at hand. In the accompanying drawing fig 1 is intended to represent the glasses as set into the rim agreeably to the pattern herewith transmitted. Any form or shape may be given to these glasses or to the segments. whether round, oval or any other figure suitably to the needs or wishes of individuals. The glasses are firmly set into the rims of spectacles [illegible] the rims are made of horn, tortoise shell, gold, [illegible] other metals or materials. and kept secure in the [illegible] by small screws. in the same manner as applied to such spectacles [illegible] used. A person using these spectacles is [illegible] [illegible] to change the focus of distance either to [illegible] [illegible] objects and with perfect ease and convenience according as the upper or lower parts of the glass is brought into operation immediately before the eyes of the observer, and whenever circumstances require the change of vision which must frequently happen. In these glasses the focus is brought where it properly should be, in the centre of each particular part or segment which renders them use agreeable and pleasant
to the eye. The glasses are all spherically ground but may
be ground cylindrical but the former mode of grinding is con-
sidered preferable as being in conformity with the formation of
the eye itself whilst the cylindrical has and is still considered
in some measure prejudicial thereto. The glasses hitherto in use
and constructed for far and near sight in the same pair of
spectacles are objectionable in several particulars: these glasses
consist of two separate and distinct pieces or segments each piece
of different thickness is placed into each rim thus making four
separate pieces of glass to every pair of spectacles and where
the pieces or segments meet or join the two pieces come into
contact by reason of this difference in the thickness of the
two pieces this causes them to be unpleasant to the eye if
not also injurious. [illegible] these two pieces frequently
fall out or spring from the rim on slight pressure partic-
ularly so when the rims are of light construction as in the
present fashion and this makes the use of them troublesome
and inconvenient. In the use of my improved glasses this
trouble and inconvenience is avoided as there are but two
glasses to a pair of spectacles. What I claim as my own
improvement and not previously known is the discovery and
invention of grinding two separate and different foci in
one piece of glass adapted to various optical purposes but prin-
cipally to be used and applied in spectacle glasses as exhibited
[illegible] in figures 1.2.3. in the accompanying drawings hereunto ann[illegible]
In grinding these glasses each focus is brought to where it should
be into the centre of each separate segment. The shape of
the glasses are cut oval round and any other shape or pat-
tern that may suit the taste or wishes of individuals. foci are
ground concave, convex, [illegible] with each other foci and
in such manner as circumstances may render necessary or as
individuals may require. or if necessary may be ground plain
prismatic

9422X

44 prismatic.

H. Schmeitmann

Urinoscopy

M. G. Bryant

F. M. Clarke

Drawing

650. W.D.

(Text illegible)